United States Patent
Szeto et al.

(10) Patent No.: US 11,373,162 B2
(45) Date of Patent: Jun. 28, 2022

(54) SYSTEMS AND METHODS FOR DISPLAYING PAYMENT DEVICE SPECIFIC FUNCTIONS

(71) Applicant: Visa International Service Association, San Francisco, CA (US)

(72) Inventors: Margaret Szeto, Mountain View, CA (US); Jaesung Park, San Francisco, CA (US); Kellen Mannion, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 451 days.

(21) Appl. No.: 15/613,565

(22) Filed: Jun. 5, 2017

(65) Prior Publication Data

US 2017/0352021 A1 Dec. 7, 2017

Related U.S. Application Data

(60) Provisional application No. 62/345,588, filed on Jun. 3, 2016.

(51) Int. Cl.
*G06Q 20/32* (2012.01)
*G06F 3/0488* (2022.01)

(52) U.S. Cl.
CPC ..... *G06Q 20/3223* (2013.01); *G06Q 20/3227* (2013.01); *G06Q 20/3274* (2013.01); *G06Q 20/3278* (2013.01); *G06F 3/0488* (2013.01)

(58) Field of Classification Search
CPC .................................................. G06Q 20/32
USPC ............................................................ 705/39
See application file for complete search history.

(56) References Cited

U.S. PATENT DOCUMENTS

2008/0040265 A1\* 2/2008 Rackley, III ........... G06Q 20/02
705/40

\* cited by examiner

*Primary Examiner* — Cho Kwong
(74) *Attorney, Agent, or Firm* — Kilpatrick Townsend & Stockton LLP

(57) ABSTRACT

Some embodiments of the invention provide a convenient system and method of displaying payment device specific functions. In other words, systems and methods are provided that allow different functions to be displayed and used for different payment devices provisioned on a communication device. These embodiments allow users to perform certain allowed functions on one payment device, and other, potentially different functions on another payment device.

16 Claims, 9 Drawing Sheets

SYSTEMS AND METHODS FOR DISPLAYING PAYMENT DEVICE SPECIFIC FUNCTIONS

CROSS-REFERENCES TO RELATED APPLICATIONS

This application claims the benefit of U.S. Provisional Patent Application No. 62/345,588, entitled "SYSTEMS AND METHODS FOR DISPLAYING PAYMENT DEVICE SPECIFIC FUNCTIONS", filed Jun. 3, 2016, the content of which is hereby incorporated by reference in its entirety.

BACKGROUND

Today, payment devices such as credit cards and debit cards are widely used for transactions. Payment devices are viewed as convenient alternatives to other payment methods, such as cash or checks. Credit cards and debit cards may be used to perform a variety of transactions, such as purchasing goods or services, depositing funds, withdrawing funds, and the like. Traditionally, credit cards and debits cards had to be physically present in order to initiate an in-person transaction (e.g., using a magnetic stripe reader).

More recently, wallet applications have been developed that provision payment devices onto a secure element of a mobile device in order to make a payment using a contactless element and near field communication. These wallet applications can be used in lieu of the physical payment device to make payments. In some cases, a separate wallet application is required for each payment device used to conduct a transaction. This may result in a large number of wallet applications being installed on the mobile device for users with many credit cards and debit cards. In addition, each application may require separate log-in and authentication information.

In some cases, a single wallet application may be used for multiple different payment devices. For example, a single wallet application may be implemented to manage and use a credit card, a debit card, a gift card, and a token, all having the same or different issuers. Despite the fact that different functions can be performed by different payment devices (particularly when different payment devices have different issuers), conventional wallet applications support only a standard set of functions that are the same across multiple payment devices. For example, the credit card, debit card, gift card, and token may all have a "pay in store" function, but may not have any other functionality.

Embodiments of the invention address these and oher problems, individually and collectively.

SUMMARY

Some embodiments of the invention provide a convenient system and method of displaying payment device specific functions. In other words, systems and methods are provided that allow different functions to be displayed and used for different payment devices provisioned on a communication device via a single application. These embodiments allow users to perform certain allowed functions on one payment device, and other, potentially different functions on another payment device.

Numerous advantages are provided by some embodiments of the present invention. For example, in embodiments of the invention, a user is able to perform different functions for different payment devices within a single application on a communication device. Thus, efficiency and functionality is increased for the user. In addition, the same or similar functions available for different payment devices may utilize and execute the same code, despite being associated with potentially different transaction processing networks and/or issuers. Thus, the application size and processing power needed is minimized.

According to some embodiments of the invention, a method is provided. The method comprises displaying, by a communication device, a plurality of payment devices. The method further comprises receiving, by the communication device, a first selection of a first payment device of the plurality of payment devices. The method further comprises displaying, by the communication device, a first plurality of functions associated with the first payment device. The method further comprises receiving, by the communication device, a second selection of a second payment device of the plurality of payment devices. The method further comprises displaying, by the communication device, a second plurality of functions associated with the second payment device. The first plurality of functions may be different than the second plurality of functions.

According to some embodiments of the invention, a communication device is provided. The communication device comprises a processor. The communication device further comprises a memory coupled to the processor. The memory stores instructions, which when executed by the processor, cause the communication device to perform operations including the steps of the methods described herein.

These and other embodiments of the invention are described in further detail below.

DETAILED DESCRIPTION

Figure 1:
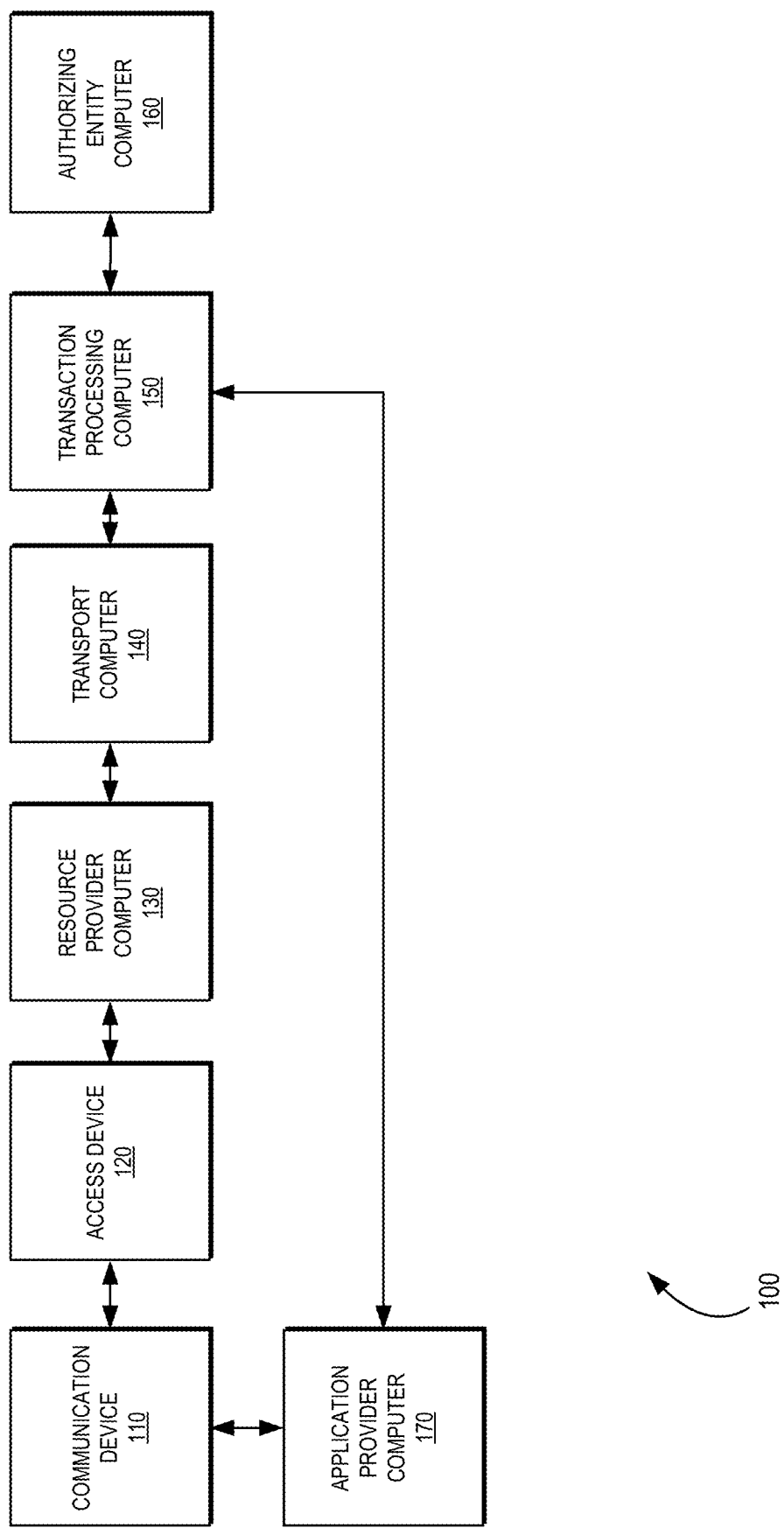
FIG. 1 shows a block diagram of a system for processing transactions according to some embodiments of the present invention.

According to some embodiments of the invention, systems and methods are provided that display and execute different functions for different payment devices. For example, a wallet application may be provisioned with two different payment devices: a credit card and a debit card. The credit card and debit card may both have a "pay in store" function. However, the debit card may also have a "get cash" function, while the credit card has a "pay bill" function. Thus, some embodiments of the invention overcome the shortcomings of conventional wallet applications that allow only certain limited functions (e.g., "pay in store") common to all provisioned payment devices.

Before discussing specific embodiments and examples, some descriptions of terms used herein are provided below.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. The POS terminal may or may not initiate processing of transactions.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer.

An "authorization request message" may be a message to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, a PIN number, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be a message reply to an authorization request message. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

An "authorizing entity" may be an entity that authorizes a request. Examples of an authorizing entity may be an issuer, a governmental agency, a document repository, an access administrator, etc.

A "communication device" may comprise any suitable electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of communication devices include mobile devices (e.g., cellular phones), PDAs, tablet computers, net books, laptop computers, personal music players, handheld specialized readers, watches, fitness bands, ankle bracelets, rings, earrings, etc., as well as automobiles with remote communication capabilities. A communication device may comprise any suitable hardware and software for performing such functions, and may also include multiple devices or components (e.g., when a device has remote access to a network by tethering to another device—i.e., using the other device as a modem—both devices taken together may be considered a single communication device).

A "credential" may comprise any evidence of authority, rights, or entitlement to privileges. For example, access credentials may comprise permissions to access certain tangible or intangible assets, such as a building or a file. In another example, payment credentials may include any suitable information associated with and/or identifying an account (e.g., a payment account and/or a payment device associated with the account). Such information may be directly related to the account or may be derived from information related to the account. Examples of account information may include an "account identifier" such as a PAN (primary account number or "account number"), an eID, a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

A "digital wallet" can include an electronic application or device that allows an individual to conduct electronic commerce transactions. A digital wallet may store user profile information, payment credentials, bank account information, one or more digital wallet identifiers, and/or the like, and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites or systems, transferring funds between users, and/or the like. A digital wallet may be designed to streamline the purchase and payment process. A digital wallet may allow the user to load one or more payment cards onto the digital wallet so as to make a payment without having to enter an account number or present a physical card. A digital wallet may also store transaction records (e.g., electronic receipts).

An "issuer" may typically refer to a business entity (e.g., a bank) that maintains an account for a user. An issuer may also issue payment credentials stored on communications devices.

A "merchant" may typically be an entity that engages in transactions and can sell goods or services, or provide access to goods or services.

A "payment device" may be any device used to make a payment. Exemplary payment devices include credit cards, debit cards, prepaid cards, and the like.

"Provisioning" may include a process of providing data for use. For example, provisioning may include providing, delivering, or enabling a token or credential on a communication device. Provisioning may be completed by any entity within or external to the transaction system. For example, in some embodiments, tokens may be provisioned by an issuer or a transaction processing network onto a mobile device. The provisioned tokens may have corresponding token data stored and maintained in a token vault or token registry. In some embodiments, a token vault or token registry may generate a token that may then be provisioned or delivered to a device. In some embodiments, an issuer may specify a token range from which token generation and provisioning can occur. Further, in some embodiments, an issuer may generate and notify a token vault of a token value and provide the token record information (e.g., token attributes) for storage in the token vault.

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

A "server computer" may include a computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "transaction processing computer" may include a network of one or more devices that can process and route transaction request messages. An exemplary transaction processing computer may include data processing subsystems, networks, and operations used to support and deliver authorization services, exception file services, transaction scoring services, and clearing and settlement services. An exemplary transaction processing system may include VisaNet™. Transaction processing systems such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

FIG. 1 shows a block diagram of system for processing transactions according to embodiments of the present invention. The system includes a communication device 110, an access device 120, a resource provider computer 130, a transport computer 140, a transaction processing computer 150, an authorizing entity computer 160, and an application provider computer 170. Each of these systems and computers may be in operative communication with each other. The communication device 110 may be operated by a user (not shown).

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

A user may operate communication device 110 to provision payment devices on communication device 110. Once provisioned on communication device 110, various functions can be performed on the payment devices. For example, the payment devices may be used to pay in-store via a contactless interface, transfer funds between payment devices, get cash at an automated teller machine (ATM), pay a friend, add funds, unload funds, deposit a check, and/or the like.

Communication device 110 may be any device suitable to carry out these functions or any other additional related actions. Communication device 110 may include a memory that may store a digital wallet application or payment application. The application may be provisioned with account information to enable the communication device 110 to conduct transactions. Communication device 110 may also include a secure element that can be implemented in either hardware and/or software, which may store sensitive account or personal information. Communication device 110 may communicate over a communication network with one or more entities, including access device 120 and/or application provider computer 170.

In embodiments in which communication device 110 includes a digital wallet application, communication device 110 may further be in communication with an application provider computer 170 that may be operated or associated with an application provider. The application provider may be an entity that provides the digital wallet application to communication device 110 for use by a user. The application provider computer 170 may maintain one or more digital wallets for each user, and each digital wallet may be associated with credentials for one or more payment accounts. Examples of digital wallets may include Visa Checkout™ or Google™ Wallet, etc. The service provider computer may send and receive over-the-air (OTA) messages to a digital wallet application stored on the communication device 110. The application provider computer 170 may include a processor and a computer readable medium coupled to the processor, the computer readable medium comprising code, executable by the processor for performing the disclosed digital wallet functionalities.

Access device 120 may be any suitable device that provides access to an external device or resource, such as, in one example, resource provider computer 130. An access device may generally be located in any suitable location, such as at the location of a resource provider. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, web interfaces, and the like. Access device 120 may use any suitable contact or contactless mode of operation to send or receive data from, or associated with, communication device 110. In some embodiments, where access device 120 may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, access device 120 may be part of resource provider computer 130.

The resource provider computer 130 may be configured to receive transaction data from access device 120 and generate authorization request messages. Resource provider computer 130 may enable a resource provider (e.g., a merchant) to engage in transactions, sell goods or services, or provide access to goods or services to the consumer. The resource provider computer 130 may accept multiple forms of payment and may use multiple tools to conduct different types of transactions. For example, the resource provider computer 130 may communicate with, include, or be an access device 120 at a physical store operated by the merchant for in-person transactions. The resource provider computer 130 may also enable the merchant to sell goods and/or services via a website, and may accept payments over the Internet. The resource provider computer 130 may comprise a server computer. The server computer may include a processor and a computer readable medium coupled to the processor, the computer readable medium comprising code, executable by the processor.

The transport computer 140 is typically a system for an entity (e.g., a bank) that has a business relationship with a particular merchant or other entity. The transport computer 140 may route the authorization request message for a transaction to the authorizing entity computer 160 via a transaction processing computer 150. The transport computer 140 may comprise a server computer. The server computer may include a processor and a computer readable medium coupled to the processor, the computer readable medium comprising code, executable by the processor.

The transaction processing computer 150 may be associated with one or more payment service providers. The transaction processing computer 150 may include any entity that provides provisioning or personalization services. For example, the transaction processing computer 150 may maintain a personalization database with user information, and the transaction processing computer 150 may be configured to communicate with one or more authorizing entity computers 160 to determine personalized payment data for users. The transaction processing computer 150 may comprise a server computer. The server computer may include a processor and a computer readable medium coupled to the processor, the computer readable medium comprising code, executable by the processor.

The authorizing entity computer 160 is typically run by a business entity (e.g., a bank) that may have issued a payment device, account numbers or payment tokens used for the transactions. Some systems can perform both authorizing entity computer 160 and transport computer 140 functions. When a transaction involves a payment account associated with the authorizing entity computer 160, the authorizing entity computer 160 may verify the account and respond with an authorization response message to the transport computer 140, the results of which may be forwarded to the consumer. In some embodiments, authorizing entity computer 160 performs authentication of payment devices and/or consumers (e.g., a user of communication device 110) prior to authorizing a transaction. In other embodiments, authentication may be performed by the resource provider computer 130, the transport computer 140, and/or the transaction processing computer 150. The authorizing entity computer 160 may comprise a server computer. The server computer may include a processor and a computer readable medium coupled to the processor, the computer readable medium comprising code, executable by the processor. In some embodiments, the authorizing entity computer 160 may communicate with the transaction processing computer 150 to conduct transactions.

At a later time after a transaction (e.g., at the end of the day), a clearing and settlement process can occur between the transport computer 140, the transaction processing computer 150, and the authorizing entity computer 160.

Figure 2:
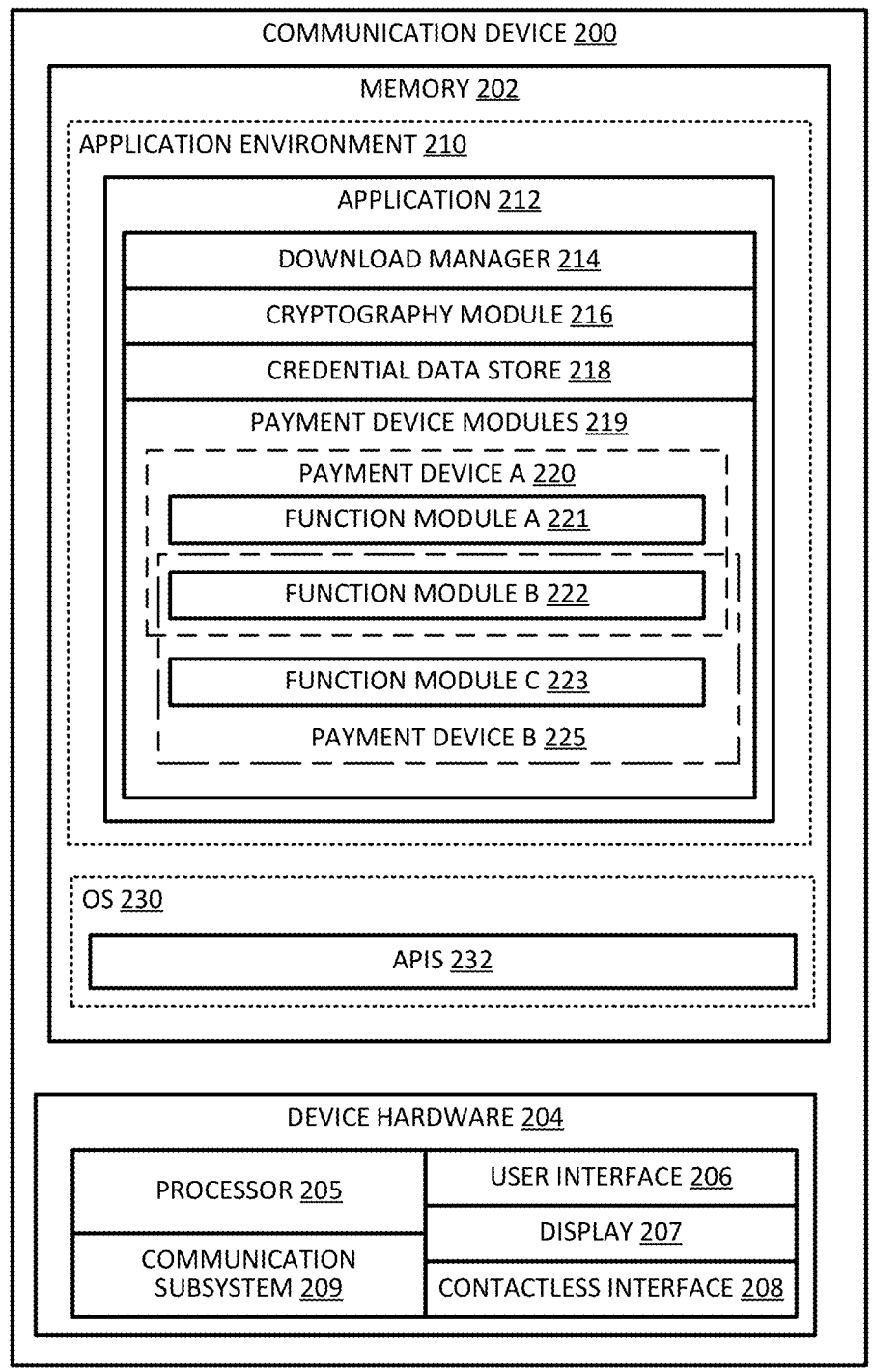
FIG. 2 shows a block diagram of a communication device according to some embodiments of the present invention.

FIG. 2 shows a block diagram of a communication device 200 according to some embodiments of the present invention. Communication device 200 may be used to implement communication device 110 of FIG. 1, for example. Communication device 200 may include device hardware 204 coupled to a memory 202. Device hardware 204 may include a processor 205, a communications subsystem 209, and a user interface 206. In some embodiments, device hardware 204 may include a display 207 (which can be part of user interface 206). Device hardware 204 may also include a contactless interface 208, for example, in some embodiments in which communication device 200 is a payment device. Processor 205 can be implemented as one or more integrated circuits (e.g., one or more single core or multicore microprocessors and/or microcontrollers), and is used to control the operation of communication device 200. Processor 205 can execute a variety of programs in response to program code or computer-readable code stored in memory 202, and can maintain multiple concurrently executing programs or processes. Communications subsystem 209 may include one or more RF transceivers and/or connectors that can be used by communication device 200 to communicate with other devices and/or to connect with external networks. User interface 206 can include any combination of input and output elements to allow a user to interact with and invoke the functionalities of communication device 200. In some embodiments, user interface 206 may include a component such as display 207 that can be used for both input and output functions.

Contactless interface 208 may include one or more specialized RF transceivers (e.g., near field communication (NFC) transceivers) to interact with a contactless reader of an access device to conduct a transaction (e.g., payment transaction, etc.). In secure element based implementations, only a secure element (not shown) may have access to contactless interface 208. In some embodiments, contactless interface 208 can be accessed by the mobile operating system 230 using specialized card emulation APIs 232 without requiring the use of a secure element. In some embodiments, display 207 can also be part of contactless interface 208, and is used, for example, to perform transactions using bar codes, QR codes, etc.

Memory 202 can be implemented using any combination of any number of non-volatile memories (e.g., flash memory) and volatile memories (e.g., DRAM, SRAM), or any other non-transitory storage medium, or a combination thereof media. Memory 202 may store an operating system (OS) 230 and an application environment 210 where one or more applications reside including application 212 to be executed by processor 205. In some embodiments, OS 230 may implement a set of card emulation APIs 232 that can be invoked by application 212 to access contactless interface 208 to interact with an access device.

Application 212 can include an application that uses, accesses, and/or stores provisioned payment devices or tokens. For example, application 212 can include a digital wallet or payment application that uses tokens and/or payment credentials associated with payment devices to conduct transactions via communication device 200. In some embodiments, access to application 212 by a user can be protected by user authentication data such as a password, passcode, PIN, etc. For example, when a user attempts to launch or execute application 212, the user may be requested to enter valid user authentication data before the user can access application 212. Application 212 may include a download manager 214, a cryptography module 216, a credential data store 218, and payment device modules 219. In some embodiments, one or more of these components can be provided by another application or component that is not part of application 212.

Download manager 214 can be programmed to provide functionalities to communicate with an application provider associated with application 212 to download information via the application provider. Download manager 214 working in conjunction with the processor 205 may request or otherwise manage the acquisition and/or storage of credentials and/or tokens. For example, download manager 214 working in conjunction with the processor 205 may request and obtain credentials and/or tokens via the application provider associated with application 212, and store the credentials and/or tokens in credential data store 218. In some embodiments, the credentials and/or tokens provided by the application provider can be received in an encrypted form. For example, the credentials and/or tokens can be encrypted with a session key generated by a server computer. Download manager 214 working in conjunction with the processor 205 may also receive, from the application provider, the session key in an encrypted form, and store the encrypted session key in credential data store 218.

Cryptography module 216 working in conjunction with the processor 205 may provide cryptographic functionalities for application 212. For example, cryptography module 216 may implement and perform encryption/decryption operations for application 212 using encryption algorithms such as DES, AES, TDES, or the like, and/or hash functions such as SHA, or the like. For example, when application 212 accesses credential data store 218 to retrieve and use the credentials and/or stored therein (e.g., to conduct a transaction), application 212 may invoke cryptography module 216 to decrypt the session key that is used to encrypt the stored credentials and/or tokens, and then decrypt the underlying information using the decrypted session key. The decrypted credentials and/or tokens can then be used by application 212.

Payment device modules 219 may include a plurality of function modules 221-223 for a plurality of payment devices 220, 225 provisioned on the communication device 200. For example, the communication device 200 may be provisioned with two payment devices: payment device A 220 and payment device B 225. Payment device A 220 may be associated with two functions executable by two function modules: function module A 221 and function module B 222. Payment device B 225 may be associated with two functions executable by two function modules: function module B 222 and function module C 223. In some embodiments, function modules A-C 221-223 may be associated with functions executable solely by the communication device 200 (e.g., "pay in store"). In some embodiments, function modules A-C 221-223 may be associated with functions executable by the communication device 200 in conjunction with a remote server and/or a transaction processing network (e.g., "transfer funds"), as described further herein, or combinations thereof.

Each function module may invoke different code to execute different functionalities with respect to payment device A 220 and payment device B 225, as described further herein. However, function module B 222, which may be invoked with respect to both payment device A 220 and payment device B 225, may execute the same code regardless of which payment device module 219 invokes it. For example, function module B 222 may be associated with a "pay in store" function. Depending on whether payment device A 220 or payment device B 225 is selected, the "pay in store" function may use the credential associated with the payment device to generate a signal transmitted by the contactless interface 208, to generate a barcode or QR code embedding the credential, etc. However, regardless of whether payment device A 220 or payment device B 225 is selected, the method of packaging and transmitting the credential may be the same. Only the underlying credential may be different.

Figure 3:
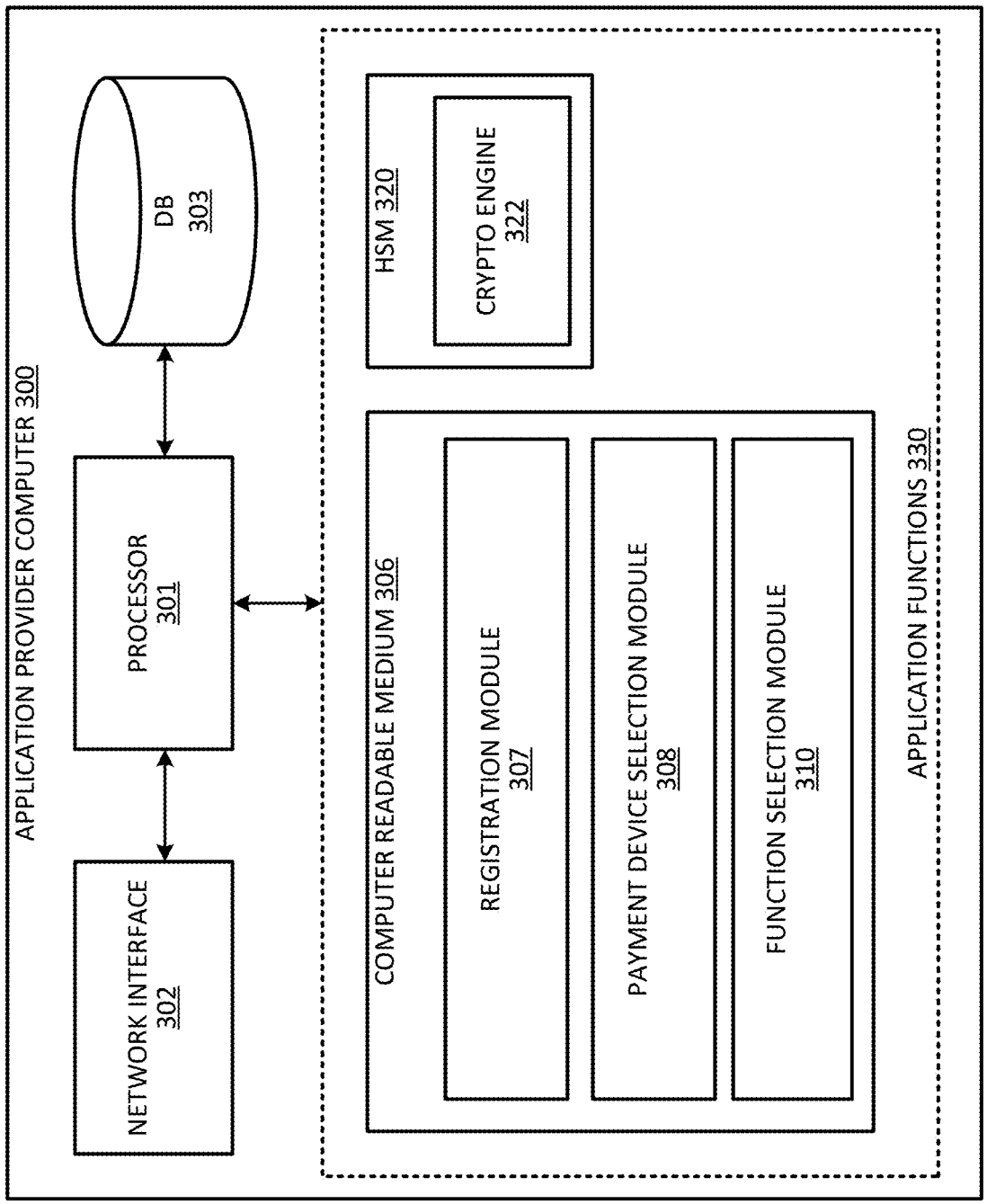
FIG. 3 shows a block diagram of an application provider computer according to some embodiments of the present invention.

FIG. 3 illustrates a block diagram of an application provider computer 300 associated with an application provider, according to some embodiments. For example, application provider computer 300 can be application provider computer 170 of FIG. 1, who provides a software application or services associated with the application for a communication device 110. Application provider computer 300 may include a processor 301 coupled to a network interface 302 and a computer readable medium 306. In some embodiments, application provider computer 300 may also include a hardware security module (HSM) 320. Application provider computer 300 may also include or otherwise have access to a database 303 that may be internal or external to application provider computer 300.

Processor 301 may include one or more microprocessors to execute program components for performing the payment device processing functions of application provider computer 300. Network interface 302 can be configured to connect to one or more communication networks to allow application provider computer 300 to communicate with other entities such as the communication device, a payment processing computer, a token server, etc. Computer readable medium 306 may include any combination of one or more volatile and/or non-volatile memories, for example, RAM, DRAM, SRAM, ROM, flash, or any other suitable memory components. Computer readable medium 306 may store code executable by the processor 301 for implementing some or all of the payment device processing functions of application provider computer 300. For example, computer readable medium 306 may include code implementing a registration module 307, a payment device selection module 308, and a function selection module 310. In some embodiments, application provider computer 300 may also include a hardware security module (HSM) 320 to implement a cryptography engine 322.

Registration module 307 may, in conjunction with processor 301, register users with application provider computer 300. For example, a user can be registered with the application provider by providing registration module 310 with user identifying information to identify the user, device information such as a device identifier associated with the user's communication device on which an application associated with the application provider is installed, account information such as an account identifier associated with the user's account, credential information associated with the user's payment devices, etc. In some embodiments, a user may set up user authentication data (e.g., password, passcode, PIN, etc.) via registration module 307. The user authentication data can be used by application provider computer 300 to authenticate the user when the application on the user's communication device communicates with application provider computer 300. Registration module 307 may also, in conjunction with processor 301, allow a user to change or update the user authentication data. The registration information can be stored in a database 303. In some embodiments, the registration process can be carried out when the user first downloads the application for installation on the user's communication device, or when the user first launches and executes the application.

Payment device selection module 308 may, in conjunction with the processor 301, query the database 303 for a list of payment devices that a user registered with the application provider computer 300 via registration module 307. Payment device selection module 308 may then, in conjunction with the processor 301, transmit the list of registered payment devices to the user's communication device. In order to perform a transaction, the user may then select a payment device from the list of payment devices, and that selection may be transmitted to the payment device selection module 308.

Function selection module 310 may, in conjunction with the processor 301, receive the selected payment device from the payment device selection module 308. The function selection module 310 may then, in conjunction with the processor 301, query the database 303 for a list of functions that are associated with the selected payment device. As discussed further herein, the list of functions associated with each payment device may be different. In some embodiments, the function selection module 310 may, in conjunction with the processor 301, query a transaction processing computer and/or authorizing entity computer associated with the selected payment device to retrieve a list of functions associated with and/or supported by the selected payment device.

Cryptography engine 322 may, in conjunction with processor 301, provide cryptographic functionalities for application provider computer 300. In some embodiments, cryptography engine 322 can be implemented in HSM 320, which is a specialized hardware component used to perform cryptographic operations and manage cryptographic keys. Cryptography engine 322 may, in conjunction with processor 301, implement and perform encryption/decryption operations for application provider computer 300 using encryption algorithms such as such as AES, DES, TDES/TDEA, or other suitable encryption algorithms using cryptographic keys of any length (e.g., 56-bit, 128-bit, 169-bit, 192-bit, 256-bit, etc.). In some embodiments, cryptography engine 322 can also perform hash calculations using hash functions such as secure hash algorithm (SHA), or the like. For example, when application provider computer 300 receives a session key used for encrypting real credentials or tokens from a token server, application provider computer 300 may invoke cryptography engine 322 to encrypt the session key, such that session key can be provided to the application on the communication device in an encrypted form. In some embodiments, the session key can be encrypted using a hash value that is computed over the user authentication data associated with the user requesting the real credential or token.

Figure 4:
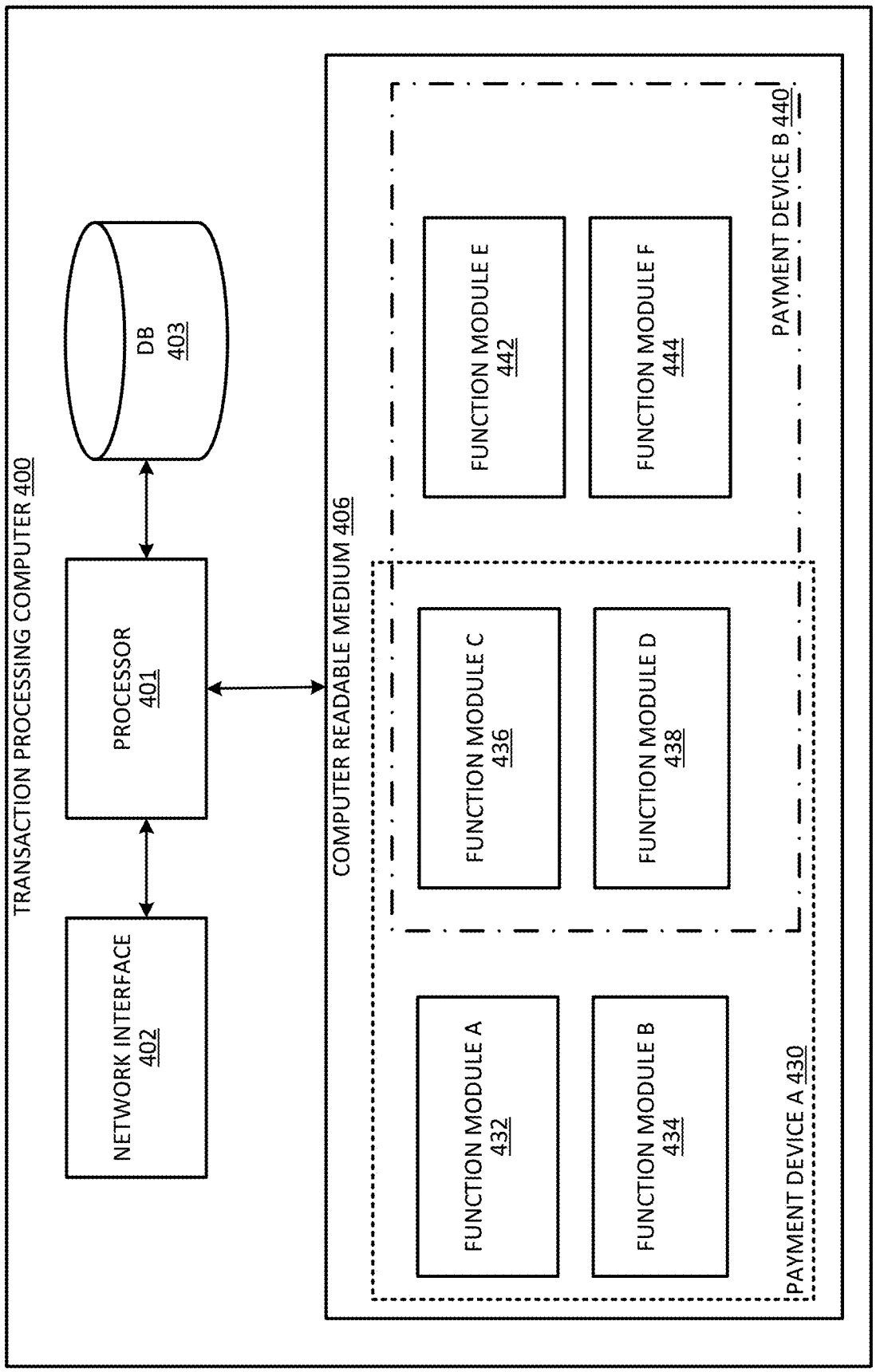
FIG. 4 shows a block diagram of a transaction processing computer according to some embodiments of the present invention.

FIG. 4 illustrates a block diagram of an transaction processing computer 400, according to some embodiments. For example, transaction processing computer 400 can be transaction processing computer 150 of FIG. 1, who provides transaction processing capabilities for payment devices. Transaction processing computer 400 may include a processor 401 coupled to a network interface 402 and a computer readable medium 406. In some embodiments, transaction processing computer 400 may also include a hardware security module (HSM) 420. Transaction processing computer 400 may also include or otherwise have access to a database 403 that may be internal or external to transaction processing computer 400.

Processor 401 may include one or more microprocessors to execute program components for performing the transaction processing functions of transaction processing computer 400. Network interface 402 can be configured to connect to one or more communication networks to allow transaction processing computer 400 to communicate with other entities such as the communication device, an application provider computer, a token server, etc. Computer readable medium 406 may include any combination of one or more volatile and/or non-volatile memories, for example, RAM, DRAM, SRAM, ROM, flash, or any other suitable memory components. Computer readable medium 406 may store code executable by the processor 401 for implementing some or all of the transaction processing functions of transaction processing computer 400. For example, computer readable medium 406 may include code implementing function modules A-F 432-444 for payment device A 430 and payment device B 440. In some embodiments, transaction processing computer 400 may also include a hardware security module (HSM) 420 to implement a cryptography engine 422.

Payment device A 430 and payment device B 440 may be two different payment devices provisioned on a communication device that may be used to initiate a transaction. Payment device A 430 and payment device B 440 may each have a plurality of associated function modules. Payment device A 430 may be associated with four functions executable by four function modules: function module A 432, function module B 434, function module C 436, and function module D 438. Payment device B 440 may be associated with four functions executable by four function modules: function module C 436, function module D 438, function module E 442, and function module F 444. In the illustrated embodiment, function modules A-F 432-444 may be associated with functions executable by the transaction processing computer 400 in conjunction with the communication device and/or other entities in a payment processing network (e.g., an authorizing entity computer). In other words, function modules A-F 432-444 may not be associated with functions executable solely by the communication device. For example, a "pay in store" function may be executed on the communication device without any input or processing by the transaction processing computer 400. On the other hand, "transfer funds", "pay a friend", "add funds", and "deposit a check" functions may require input and/or processing facilitated by the transaction processing computer 400, and thus may be included in the function modules A-F 432-444.

Each function module may invoke different code to execute different functionalities with respect to payment device A 430 and payment device B 440. However, function module C 436 and function module D 438, which may be invoked with respect to both payment device A 430 and payment device B 440, may execute the same code regardless of which payment device 430 or 440 invokes it. For example, function module C 436 may be associated with a "pay in store" function. Depending on whether payment device A 430 or payment device B 440 is selected, the "pay in store" function may use the credential associated with the payment device to generate a signal transmitted by the contactless interface of the communication device, to generate a barcode or QR code embedding the credential, etc. However, regardless of whether payment device A 430 or payment device B 440 is selected, the method of packaging and transmitting the credential may be the same. Only the underlying credential may be different.

Although not illustrated, it is contemplated that the transaction processing computer 400 may include one or more of a number of other modules to perform transaction processing functions. For example, the transaction processing computer 400 may include a communication module. The communication module may be configured or programmed to receive and generate electronic messages comprising information transmitted through the transaction processing computer 400 to or from any of the entities shown in FIG. 1. When an electronic message is received by the transaction processing computer 400 via network interface 402, it may be passed to the communications module. The communications module may, in conjunction with processor 401, identify and parse the relevant data based on a particular messaging protocol used in the transaction processing computer 400. The received information may comprise, for instance, identification information, transaction information, and/or any other information that the transaction processing computer 400 may utilize in authorizing a financial transaction or performing a settlement and clearing procedure. The communication module may then, in conjunction with processor 401, transmit any received information to an appropriate module within the transaction processing computer 400 (e.g., via a data bus line). The communication module may also, in conjunction with processor 401, receive information from one or more of the modules in transaction processing computer 400 and generate an electronic message in an appropriate data format in conformance with a transmission protocol used in a transaction system (e.g., system 100 of FIG. 1), so that the message may be sent to one or more components within the system (e.g., to an authorizing entity computer). The electronic message may then be passed to the network interface 402 for transmission. The electronic message may, for example, comprise an authorization response message (e.g., to be transmitted to a merchant conducting a transaction), or may be an authorization request message to be transmitted or forwarded to an authorizing entity computer.

The transaction processing computer 400 may include a database look-up module. The database look-up module may be programmed or configured to perform some or all of the functionality associated with retrieving information from one or more databases 403. In this regard, the database look-up module may, in conjunction with processor 401, receive requests from one or more of the modules of the transaction processing computer 400 for information that may be stored in one or more of the databases 403. The database look-up module may then, in conjunction with processor 401, determine and a query an appropriate database.

The transaction processing computer 400 may include a database update module. The database update module may be programmed or configured to maintain and update the database 403, including, for example, an authorization database. In this regard, the database update module may, in conjunction with processor 401, receive information about a user, financial institution, a payment device, and/or current or past transaction information from one of the modules discussed herein. This information may then be stored in the appropriate location in the database 403 using any suitable storage process.

The transaction processing computer 400 may include a report generation module. The report generation module may be programmed or configured to perform some or all of the functionality associated with generating a report regarding a user, an account, a transaction or transactions, or any other entity or category of information with regard to an authentication or transaction system. This may include, for instance, identifying patterns (such as patterns that indicate a fraudulent transaction or transactions) and generating one or more alerts that may be sent (e.g., via the communication module and network interface 402) to one or more entities in the transaction system, including the user, the communication device, the resource provider, and/or the authorizing entity. The report generation module may also, in conjunction with processor 401, request information from the database 403 516 via database look-up module.

The transaction processing computer 400 may include an authorization module. The authorization module may be configured or programmed to perform some or all the functionality associated with authorizing a financial transaction associated with an authorization request message, or transmitting the authorization request message to another entity such as an issuer. The authorization request message may be associated with a transaction involving a credential. The authorization request message may include any suitable information that may be used to authorize or identify the transaction, and may be generated in response to an interaction. The authorization module may, for instance, be programmed or configured to compare the information received by via the authorization request message with stored information at the transaction processing computer 400 or a database 403 (such as comprising verification values). In some embodiments, if the received and stored values match, the authorization module may, in conjunction with processor 401, authorize the transaction (or may be more likely to authorize the transaction) and may instruct the communication module to generate an authorization response message. The authorization module may also be programmed or configured to execute any further operations associated with a typical authorization.

Database 403 may include one or more databases of data, such as an authorization database. Each of the databases described may comprise more than one database, and may be located in the same location or at different locations. The authorization database may contain information related to a credential and/or a payment account, as well as any other suitable information (such as transaction information) associated with the credential. For example, the authorization database may comprise a relational database having a plurality of associated fields, including a primary account identifier (e.g., a PAN), an authorizing entity associated with the account, expiration date of a payment device, a verification value(s), an amount authorized for a transaction, a user name, user contact information, prior transaction data, etc. In some embodiments, the authorization module may utilize some or all of the information stored in the authorization database when authorizing a transaction.

Figure 5A:
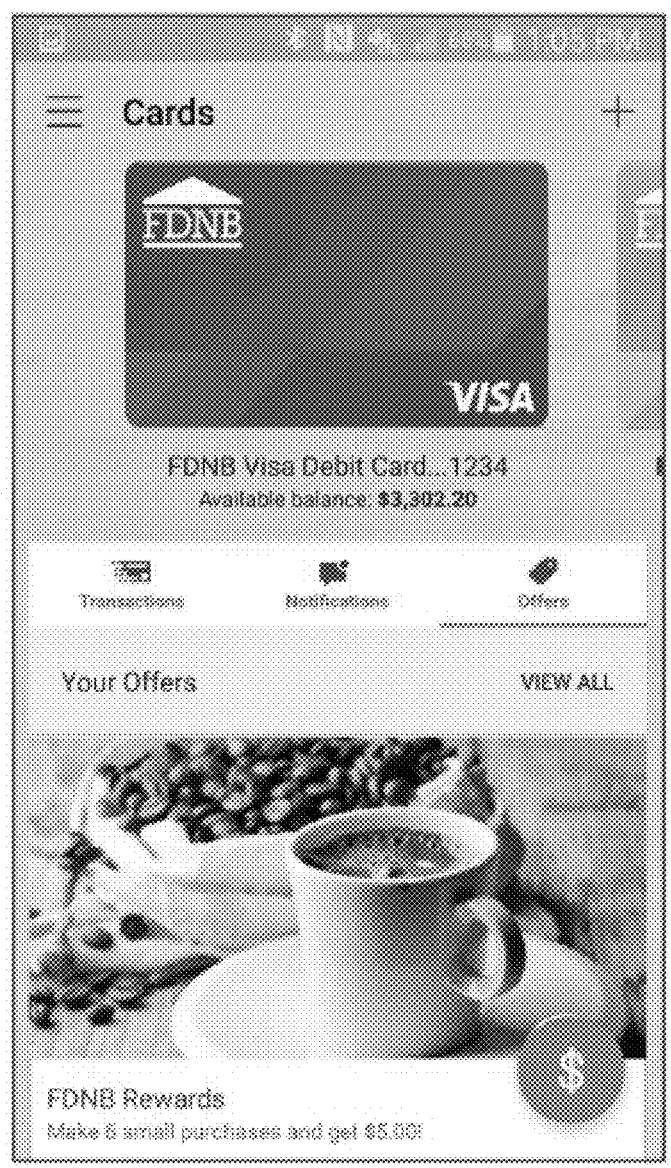
FIG. 5A shows a screen shot of an application displaying a payment device for selection according to some embodiments of the present invention.

FIG. 5A shows a screen shot of an application (e.g. application 212 of FIG. 2) displaying a provisioned payment device for selection according to some embodiments of the present invention. FIG. 5A may be displayed on communication device 110 of FIG. 1 and/or communication device 200 of FIG. 2, for example. In FIG. 5A, a first payment device of a plurality of payment devices ("cards") is displayed, along with the name of the payment device ("FDNB Visa Debit Card"), the last 4 digits of the payment device ("1234"), and the available balance ($3,302.20). Various tabs can be selected, such as "Transactions", "Notifications", and "Offers".

When selected, the "Transactions" tab may display a subset of transactions made using the payment device. The subset of transactions may be, for example, a set of the most recent transactions made using the payment device (e.g., the last 10 transactions made with the payment device). In some embodiments, the subset of transactions may further be limited to transactions made with the provisioned payment device, as opposed to transactions made with the actual, physical payment device (e.g., physical payment card). In some embodiments, the subset of transactions may include all transactions in which the payment device was used (i.e., both the physical payment device and the provisioned payment device).

When selected, the "Notifications" tab may display notifications or messages relating to the payment device. For example, the notifications may include a notification of a low balance. In another example, the notifications may include a notification of a suspected fraudulent charge to the payment device.

In the example shown in FIG. 5A, the "Offers" tab is selected. The "Offers" tab may display any offers available to the user of the payment device, such as offers relevant to or associated with the payment device. For example, the offer displayed in FIG. 5A, "FDNB Rewards", may be an offer specific to the issuer of the payment device, FDNB.

Figure 5B:
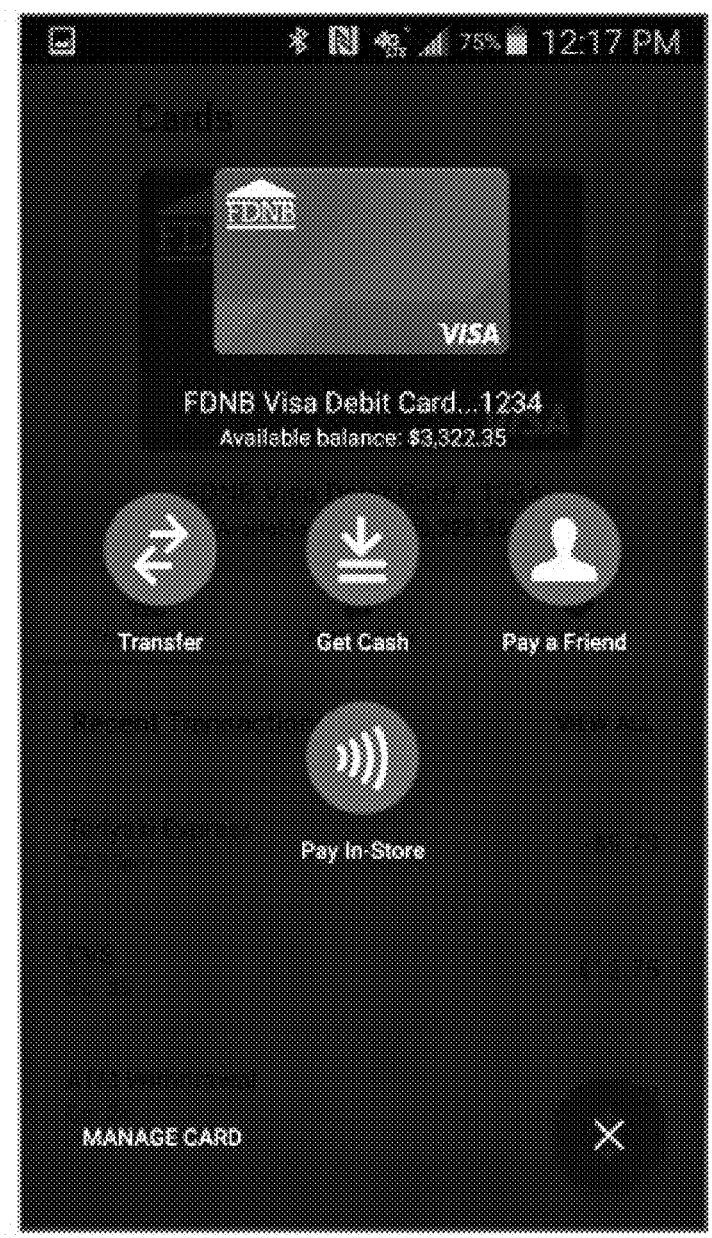
FIG. 5B shows a screen shot of an application displaying functions specific to the payment device selected in FIG. 5A according to some embodiments of the present invention.

FIG. 5B shows a screen shot of an application displaying functions specific to the payment device that was selected from the screen of FIG. 5A according to some embodiments of the present invention. The payment device, "FDNB Visa Debit Card", may have been selected by clicking text or the image associated with the payment device in FIG. 5A, for example. In FIG. 5B, the selected payment device is displayed, along with the name of the payment device ("FDNB Visa Debit Card"), the last 4 digits of the payment device ("1234"), and the available balance ($3,302.20).

Various functions associated with the selected payment device may also be displayed. In this example, buttons are displayed corresponding to the functions of "Transfer", "Get Cash", "Pay a Friend", and "Pay In-Store". When selected, the "Transfer" function may allow a user to transfer funds between two accounts associated with two payment devices provisioned on the communication device. The "Get Cash" function may allow a user to use the communication device to communicate with an automated teller machine (ATM) to withdraw money from the ATM, such as through a contactless interface. The "Pay a Friend" function may allow a user to transfer funds from the account associated with the selected payment device to another account for another user. The "Pay In-Store" function may allow a user to use the communication device, such as through a contactless interface, to communicate details of the selected payment device to an access device at a merchant in order to make a purchase.

Figure 6A:
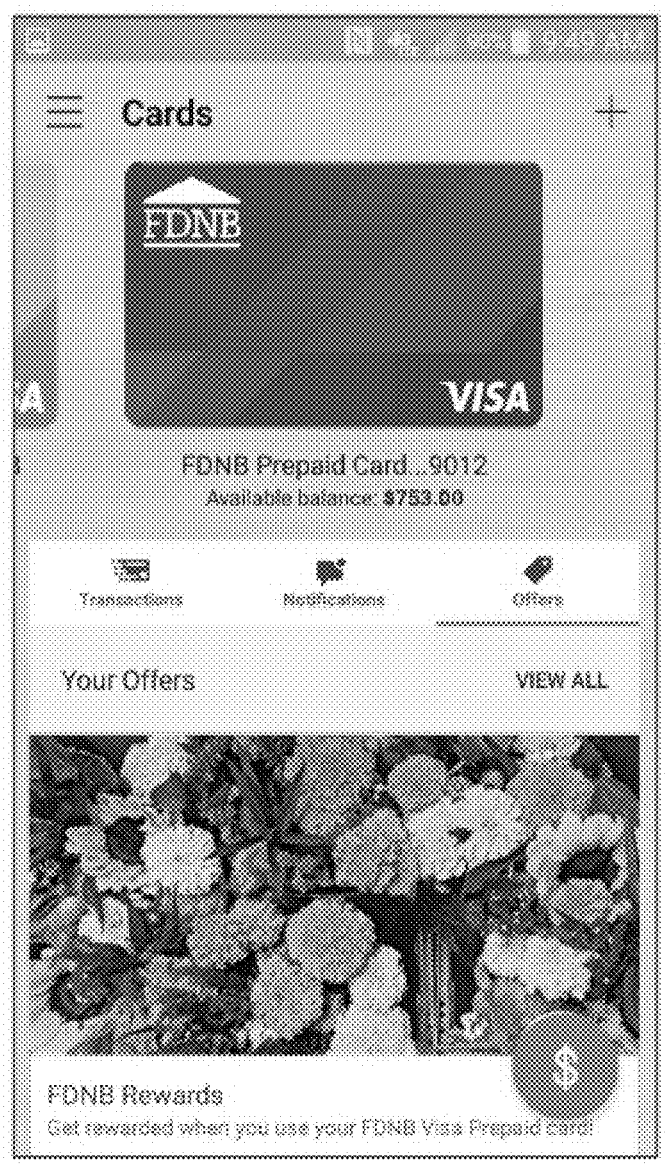
FIG. 6A shows a screen shot of an application displaying another payment device for selection according to some embodiments of the present invention.

FIG. 6A shows a screen shot of an application (e.g., application 212 of FIG. 2) displaying another provisioned payment device for selection according to an embodiment of the present invention. FIG. 6A may be displayed on communication device 110 of FIG. 1 and/or communication device 200 of FIG. 2, for example. In FIG. 6A, a second payment device of a plurality of payment devices ("cards") is displayed, along with the name of the payment device ("FDNB Prepaid Card"), the last 4 digits of the payment device ("9012"), and the available balance ($753.00). Various tabs can be selected, such as "Transactions", "Notifications", and "Offers". These tabs may be as described above with respect to FIG. 5A.

Figure 6B:
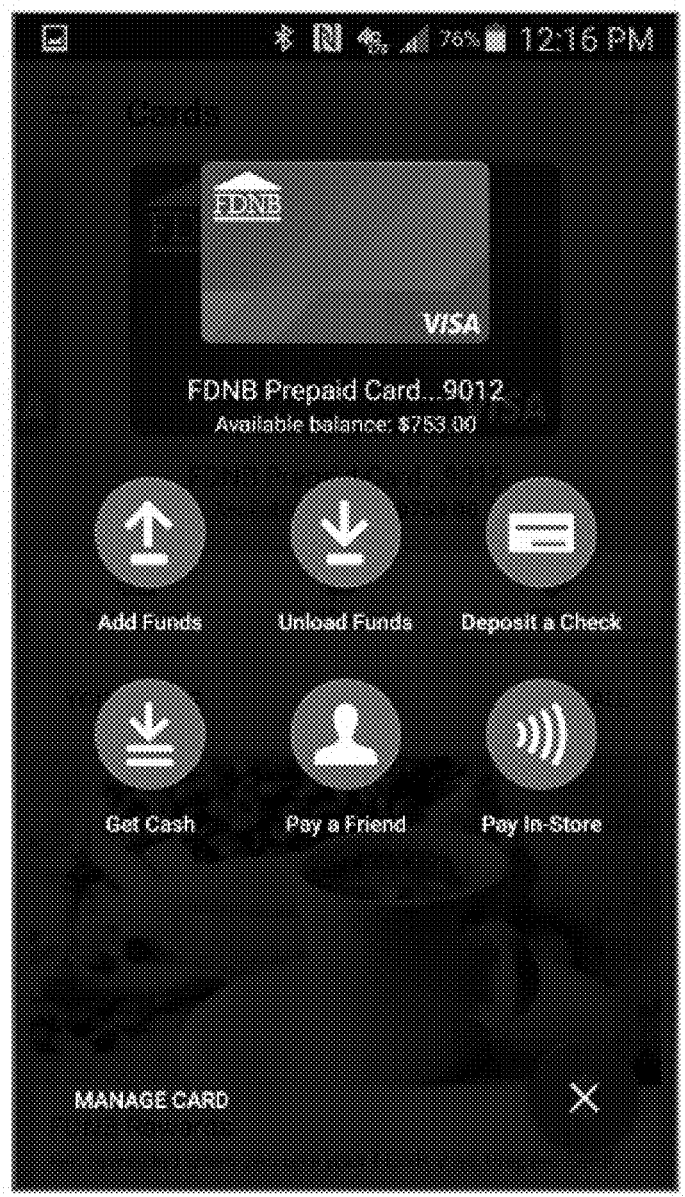
FIG. 6B shows a screen shot of an application displaying functions specific to the payment device selected in FIG. 6A according to some embodiments of the present invention.

FIG. 6B shows a screen shot of an application displaying functions specific to the payment device that was selected from the screen of FIG. 6A according to an embodiment of the present invention. The payment device, "FDNB Prepaid Card", may have been selected by clicking text or the image associated with the payment device in FIG. 6A, for example. In FIG. 6B, the selected payment device is displayed, along with the name of the payment device ("FDNB Prepaid Card"), the last 4 digits of the payment device ("9012"), and the available balance ($753.00).

Various functions associated with the selected payment device may also be displayed. These functions may be the same or different as the functions displayed with respect to the first payment device of FIG. 5B. The type of functions available with each payment device may depend on any of a number of criteria. For example, the functions available may depend on the type of payment device (e.g., credit card, debit card, prepaid card, etc.), the type of underlying account (e.g., checking, savings, etc.), the issuer of the payment device, the available balance for the account, the type of user (e.g., individual, corporate, etc.), and the like. Any or all of the available functions for a particular device may be displayed when that payment device is selected.

In this example, buttons are displayed corresponding to the functions of "Add Funds", "Unload Funds", "Deposit a Check", "Get Cash", "Pay a Friend", and "Pay In-store". When selected, the "Add Funds" function may allow a user to add funds to the prepaid card, such as by transferring funds from another provisioned payment device onto the prepaid card. The "Unload Funds" function may allow a user to remove funds from the prepaid card, such as by transferring funds from the prepaid to another provisioned payment device. The "Deposit a Check" function may allow a user to add funds from a check onto the prepaid card, as is described with respect to FIG. 7. The "Get Cash" function may allow a user to use the communication device to communicate with an automated teller machine (ATM) to withdraw money from the ATM, such as through a contactless interface. The "Pay a Friend" function may allow a user to transfer funds from the account associated with the selected payment device to another account for another user. The "Pay In-Store" function may allow a user to use the communication device, such as through a contactless interface, to communicate details of the selected payment device to an access device at a merchant in order to make a purchase.

Figure 7:
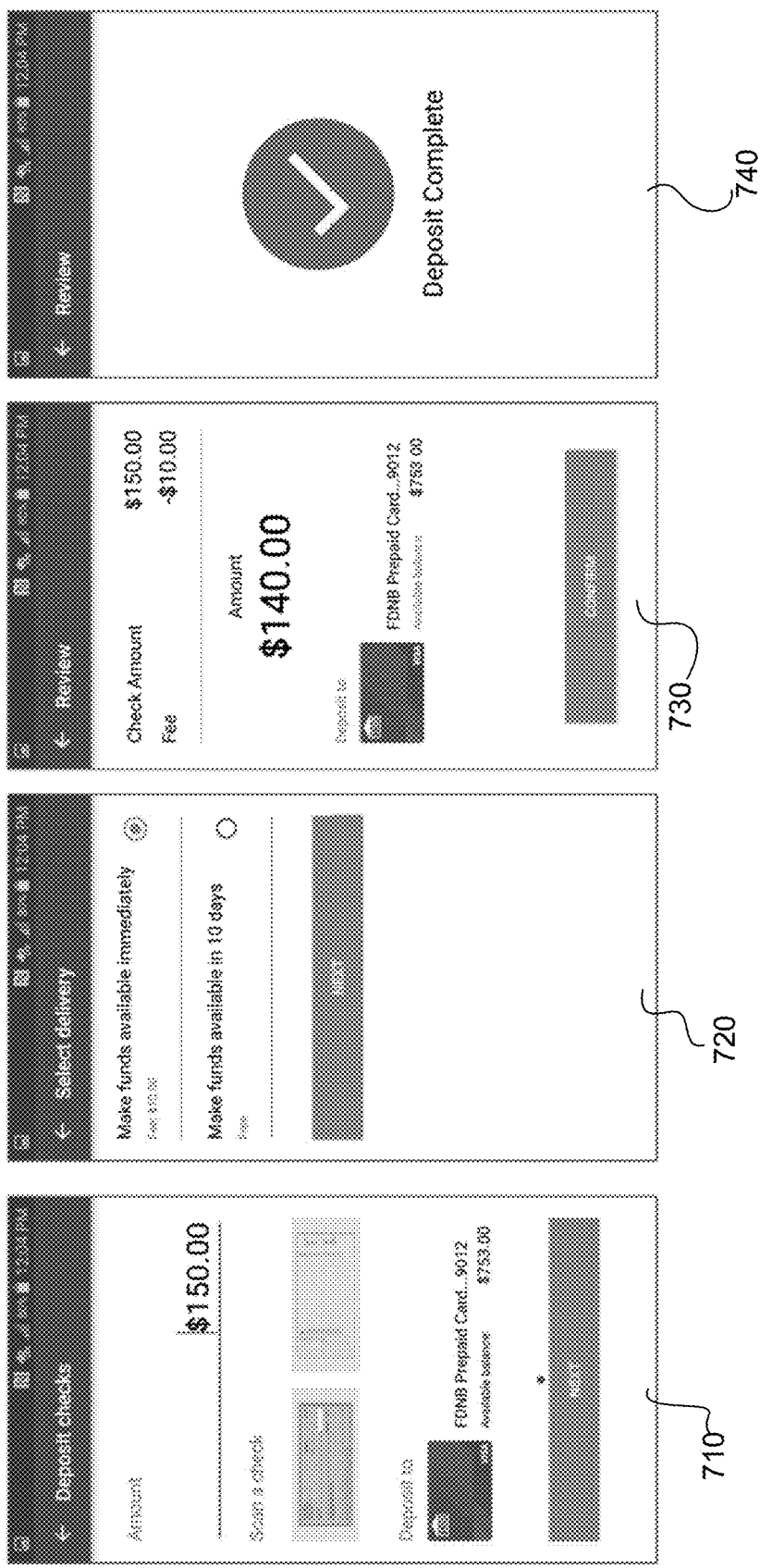
FIG. 7 shows a series of screen shots of an application displaying the "Deposit a Check" function selected in FIG. 6B according to some embodiments of the invention.

FIG. 7 shows a series of screen shots of an application displaying the "Deposit a Check" function in response to a selection of the "Deposit a Check" button in FIG. 6B according to an embodiment of the invention. On screen 710, the user of the communication device enters the amount of the check (e.g., $150.00), attaches images of the front and back of the check, confirms that the payment device selected in FIG. 6B is the correct payment device to deposit to, and clicks "next" to move to screen 720. At screen 720, the user selects whether to make the funds available to the payment device immediately, which incurs a fee of $10.00, or to make the funds available to the payment device after the check clears (e.g., in 10 days) for free. In this example, the user selects to make the funds available immediately, and clicks "next" to move to screen 730. At screen 730, the user may review the deposit amount of $140.00 (the check amount of $150.00 minus the $10.00 fee) and the payment device to which the amount will be deposited, and clicks "confirm" to move to screen 740. At screen 740, a confirmation that the deposit was completed is displayed.

The various participants and elements described herein may operate one or more computer apparatuses to facilitate the functions described herein. Any of the elements in the above-described figures, including any servers or databases, may use any suitable number of subsystems to facilitate the functions described herein.

Such subsystems or components are interconnected via a system bus. Subsystems may include a printer, keyboard, fixed disk (or other memory comprising computer readable media), monitor, which is coupled to display adapter, and others. Peripherals and input/output (I/O) devices, which couple to an I/O controller (which can be a processor or other suitable controller), can be connected to the computer system by any number of means known in the art. For example, an external interface can be used to connect the computer apparatus to a wide area network such as the Internet, a mouse input device, or a scanner. The interconnection via the system bus allows the central processor to communicate with each subsystem and to control the execution of instructions from system memory or the fixed disk, as well as the exchange of information between subsystems. The system memory and/or the fixed disk may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
    displaying, by a communication device, a plurality of payment devices on a display of the communication device, the payment devices being payment cards;
    in response to displaying the plurality of payment devices, receiving, by the communication device, a first selection of a first payment device of the plurality of payment devices via a user interface of the communication device;
    in response to receiving the first selection of the first payment device, displaying, by the communication device, a first plurality of functions associated with the first payment device on the display of the communication device, the first plurality of functions being specific to the first payment device and the first plurality of functions initiating different types of payment functions with the first payment device;
    receiving, by the communication device, a first input selecting a first function of the first plurality of functions via the user interface of the communication device;
    responsive to receiving the first input selecting the first function of the first plurality of functions, transmitting, by the communication device, a request for a first credential from a credential data store;
    receiving, by the communication device, the first credential in encrypted form from the credential data store, wherein the first credential encrypted using a session key;
    decrypting, by the communication device, an encrypted session key using a cryptography module to obtain the session key;
    decrypting, by the communication device, the first credential in encrypted form using the session key;
    executing the first function of the first plurality of functions using the first credential, which is unique to the first payment device;

receiving, by the communication device, a second selection of a second payment device of the plurality of payment devices via the user interface of the communication device;

in response to receiving the second selection of the second payment device, displaying, by the communication device, a second plurality of functions associated with the second payment device on the display of the communication device, the second plurality of functions being specific to the second payment device and the second plurality of functions initiating different types of payment functions with the second payment device, wherein the first plurality of functions includes at least one function that is different than the second plurality of functions;

receiving a second input selecting the first function included in the second plurality of functions via the user interface of the communication device;

responsive to receiving the second input selecting the first function of the second plurality of functions, transmitting, by the communication device, a request for a second credential from the credential data store;

receiving, by the communication device, the second credential in encrypted form from the credential data store, wherein the second credential was encrypted using the session key;

decrypting, by the communication device, the second credential in encrypted form using the session key to obtain the second credential;

executing the first function of the second plurality of functions using a second credential unique to the second payment device, receiving, by the communication device, a third selection of the first payment device of the plurality of payment devices;

in response to receiving the third selection of the first payment device, displaying, by the communication device, the first plurality of functions associated with the first payment device;

receiving a third input selecting a second function of the first plurality of functions; and executing the second function of the first plurality of functions using the first credential.

2. The method of claim 1, wherein the first payment device is associated with a first authorizing entity, wherein the second payment device is associated with a second authorizing entity, and wherein the first authorizing entity is different than the second authorizing entity.

3. The method of claim 1, wherein the first plurality of functions associated with the first payment device and the second plurality of functions associated with the second payment device are displayed by a same application installed on the communication device.

4. The method of claim 1, wherein the first payment device is associated with the first credential, wherein the second payment device is associated with the second credential, and wherein the first credential is different than the second credential.

5. The method of claim 1, further comprising:
provisioning the plurality of payment devices on the communication device.

6. The method of claim 1, wherein the plurality of payment devices are associated with a same user.

7. A communication device comprising:
a processor, and
a memory coupled to the processor, the memory storing instructions, which when executed by the processor, cause the communication device to perform operations including:

displaying, by the communication device, a plurality of payment devices on a display of the communication device, the payment devices being payment cards;

in response to displaying the plurality of payment devices, receiving, by the communication device, a first selection of a first payment device of the plurality of payment devices via a user interface of the communication device;

in response to receiving the first selection of the first payment device, displaying, by the communication device, a first plurality of functions associated with the first payment device on the display of the communication device, the first plurality of functions being specific to the first payment device and the first plurality of functions initiating different types of payment functions with the first payment device;

receiving, by the communication device, a first input selecting a first function of the first plurality of functions via the user interface of the communication device;

responsive to receiving the first input selecting the first function of the first plurality of functions, transmitting, by the communication device, a request for a first credential from a credential data store;

receiving, by the communication device, the first credential from the credential data store, wherein the first credential encrypted using a session key;

decrypting, by the communication device, the session key using a cryptography module;

decrypting, by the communication device, the first credential using the decrypted session key;

executing the first function of the first plurality of functions using the first credential unique to the first payment device;

receiving, by the communication device, a second selection of a second payment device of the plurality of payment devices via the user interface of the communication device;

in response to receiving the second selection of the second payment device, displaying, by the communication device, a second plurality of functions associated with the second payment device on the display of the communication device, the second plurality of functions being specific to the second payment device and the second plurality of functions initiating different types of payment functions with the second payment device, wherein the first plurality of functions includes at least one function that is different than the second plurality of functions;

receiving a second input selecting the first function included in the second plurality of functions via the user interface of the communication device;

responsive to receiving the second input selecting the first function of the second plurality of functions, transmitting, by the communication device, a request for a second credential from the credential data store;

receiving, by the communication device, the second credential from the credential data store, wherein the second credential encrypted using the session key;

decrypting, by the communication device, the second credential using the decrypted session key;

executing the first function of the second plurality of functions using the second credential unique to the second payment device, receiving, by the communication device, a third selection of the first payment device of the plurality of payment devices;

in response to receiving the third selection of the first payment device, displaying, by the communication device, the first plurality of functions associated with the first payment device;

receiving a third input selecting a second function of the first plurality of functions; and executing the second function of the first plurality of functions using the first credential.

8. The communication device of claim 7, wherein the first payment device is associated with a first authorizing entity, wherein the second payment device is associated with a second authorizing entity, and wherein the first authorizing entity is different than the second authorizing entity.

9. The communication device of claim 7, wherein the first plurality of functions associated with the first payment device and the second plurality of functions associated with the second payment device are displayed by a same application installed on the communication device.

10. The communication device of claim 7, wherein the first payment device is associated with the first credential, wherein the second payment device is associated with the second credential, and wherein the first credential is different than the second credential.

11. The communication device of claim 7, further comprising:

provisioning the plurality of payment devices on the communication device.

12. The communication device of claim 7, wherein the plurality of payment devices are associated with a same user.

13. The method of claim 1, wherein the first plurality of functions includes the second function that is executed using code that is not shared with any function in the second plurality of functions.

14. The communication device of claim 7, wherein the first plurality of functions includes the second function that is executed using code that is not shared with any function in the second plurality of functions.

15. The method of claim 1, wherein the first function is a pay in store function.

16. The method of claim 1, wherein the first function is a pay a friend function.

\* \* \* \* \*